(12) United States Patent
McDonald

(10) Patent No.: US 7,765,734 B2
(45) Date of Patent: Aug. 3, 2010

(54) FIRE ANT COLONY KILLER

(76) Inventor: Ken McDonald, 291 FM 3164, Gainesville, TX (US) 76240

( * ) Notice: Subject to any disclaimer, the term of this patent is extended or adjusted under 35 U.S.C. 154(b) by 0 days.

(21) Appl. No.: 11/652,296

(22) Filed: Jan. 12, 2007

(65) Prior Publication Data

US 2008/0168704 A1 Jul. 17, 2008

(51) Int. Cl.
*A01M 17/00* (2006.01)
(52) U.S. Cl. ........................ 43/132.1; 43/124
(58) Field of Classification Search .............. 43/124, 43/132.1
See application file for complete search history.

(56) References Cited

U.S. PATENT DOCUMENTS

| | | | | |
|---|---|---|---|---|
| 1,380,902 A * | 6/1921 | Harrison | ..................... | 43/132.1 |
| 1,427,931 A * | 9/1922 | Batla et al. | ..................... | 171/24 |
| 1,477,081 A * | 12/1923 | Salinas | ........................ | 43/111 |
| 2,873,551 A * | 2/1959 | Misko | ........................ | 43/111 |
| 5,369,908 A * | 12/1994 | Morales | ........................ | 43/111 |
| 5,425,197 A * | 6/1995 | Smith | ........................ | 43/113 |
| 5,501,034 A * | 3/1996 | Hazan | ........................ | 43/132.1 |
| 5,628,142 A * | 5/1997 | Kitterman et al. | ............. | 43/114 |
| 5,634,292 A * | 6/1997 | Kitterman | ..................... | 43/115 |
| 5,651,211 A * | 7/1997 | Regan et al. | .................. | 43/113 |
| 5,829,187 A * | 11/1998 | Weiser | ........................ | 43/116 |
| 6,178,687 B1 * | 1/2001 | Frisch | ........................ | 43/114 |
| 6,708,443 B2 * | 3/2004 | Hall | ........................ | 43/107 |
| 6,871,443 B2 * | 3/2005 | Lambert et al. | ............... | 43/113 |
| 2003/0192229 A1 * | 10/2003 | Wilbanks | ..................... | 43/112 |
| 2004/0255507 A1 * | 12/2004 | Belmont et al. | ............... | 43/107 |
| 2006/0260183 A1 * | 11/2006 | Hockaday | ..................... | 43/129 |

* cited by examiner

*Primary Examiner*—Christopher P Ellis
(74) *Attorney, Agent, or Firm*—Arthur W. Fisher

(57) ABSTRACT

A mechanized exterminator and several embodiments thereof are presented. A drive mechanism operates a support mechanism having rollers attached thereto and which roll over a base, crushing insects such as fire ants. The drive mechanism may be powered by battery or other forms of electricity or may be solar or wind powered. The exterminator is cost-effective and environmentally safe. The exterminator severely impacts the strength and health of the colony minimizing its ability to reproduce.

20 Claims, 2 Drawing Sheets

FIRE ANT COLONY KILLER

BACKGROUND OF THE INVENTION

Description of the Related Art

Insect extermination, particularly for undesirable external insects, has been largely confined to chemical treatments. Zappers are used for certain flying insects. These chemical treatments are often ineffective and always create environmental and health concerns.

Fire ants, in particular, are very aggressive and their bites are always hurtful and sometimes dangerous. The usual result from a chemical treatment is that the colony relocates. Often, they become even more aggressive as a result.

Thus, there is a need in the art for a method and apparatus for a cost efficient and truly effective system for exterminating insects, particularly fire ants.

There is also a need in the art for a method and apparatus for exterminating insects which is non-chemical and completely safe both environmentally and from a health perspective.

SUMMARY OF THE INVENTION

A method and apparatus for a mechanized exterminator comprising one or more rollers for crushing and a power source for operating the rollers.

The method and apparatus for a mechanized exterminator as described above wherein the power source comprises a motor and a source for electrical power.

The method and apparatus for a mechanized exterminator as described above wherein the source for electrical power comprises one or more solar cells.

The method and apparatus for a mechanized exterminator as described above wherein the source for electrical power comprises one or more batteries.

The method and apparatus for a mechanized exterminator as described above wherein the batteries are rechargeable and further comprising solar cells to recharge the batteries.

The method and apparatus for a mechanized exterminator as described above wherein the power source is a wind powered drive mechanism.

The method and apparatus for a mechanized exterminator as described above wherein the rollers are castors.

The method and apparatus for a mechanized exterminator as described above further comprising a cover.

A method and apparatus for a mechanized exterminator comprising a drive means, a support means coupled to the drive means, one or more rollers coupled to the support means; and a base for the rollers to move over and crush the insects.

The method and apparatus for a mechanized exterminator as described above wherein the drive means comprises a motor and a source of electrical power.

The method and apparatus for a mechanized exterminator as described above wherein the source of electrical power is one or more batteries.

The method and apparatus for a mechanized exterminator as described above wherein the source of electrical power is one or more solar cells.

The method and apparatus for a mechanized exterminator as described above wherein the drive means is wind powered.

The method and apparatus for a mechanized exterminator as described above wherein the rollers are castors.

The method and apparatus for a mechanized exterminator as described above further comprising a cover.

A method for a mechanized extermination system comprising the steps of: operating one or more rollers for crushing; and crushing the insects.

The method for a mechanized extermination system as described above further comprising the step of attracting the insects to the rollers.

The method for a mechanized extermination system as described above having a drive means, a support means coupled to the drive means and coupled to the rollers, and a base over which the rollers move, and further comprising the steps of applying power to the drive means, operating the support means by the drive means and moving the rollers over the base thereby crushing insects on the base.

DETAILED DESCRIPTION

Whilst the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not limit the scope of the invention. Moreover, the present invention, while described for the extermination of fire ants and fire ant colonies, may be utilized to exterminate a wide variety of insects.

Figure 1:
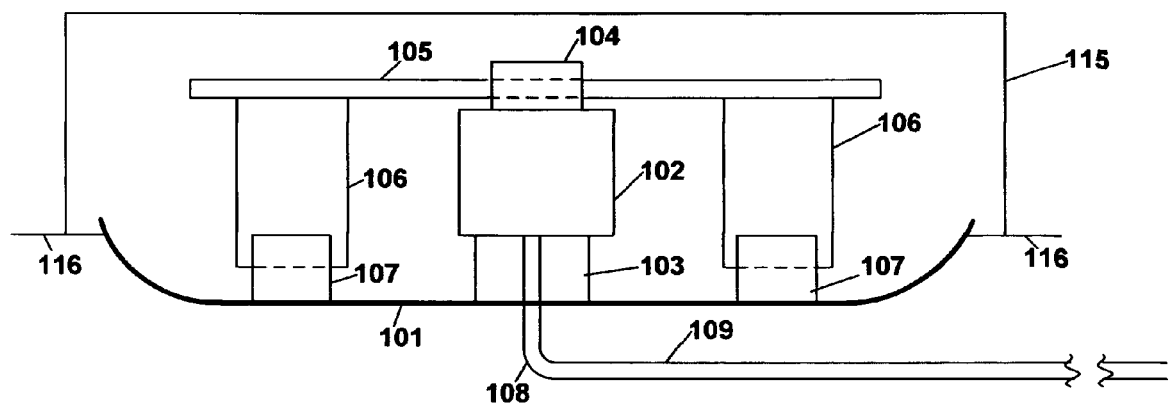
FIG. 1 is a cross-sectional view of the mechanized insect exterminator.

Referring now to FIG. 1, a cross-sectional view of the mechanized exterminator 100 is depicted. A circular base 101 is depicted having curved ends. The base 101 may be constructed out of metal, plastic and/or a wide variety of materials. The base 101 functions as both a base for the exterminator and also to provide a hard, smooth surface for rollers 107 to roll over and crush insects in the pathway of the rollers 107. The curved end or circumference of the base 101 serves to retain the dead bodies of the insects after crushing for easy disposal/clean-up. It will be appreciated that base 101 may be of any shape and that the ends or circumference/perimeter may be flat or any shape.

A low speed motor 102 is secured to the base 101 by means of mounting assembly 103. It will be appreciated that mounting assembly 103 may be of a wide variety of types and shapes and its purpose is primarily to secure the motor 102 to the base 101. Alternatively, the motor 102 may be directly fastened to the base.

The motor 102 has a pair of electrical power conduits 108 and 109 extending from the bottom of the motor, through the base 101 and then connected to an electrical power source. It will be appreciated that a variety of methods of furnishing the motor 102 with power to operate may be employed and that a wide variety of methods for connecting the motor to a power source may be utilized within the scope of the present invention. For example, a battery powered motor may be utilized thereby eliminating the need for electrical conduits 108 and 109.

The motor 102 also has extending from the top thereof, a rotor 104 which revolves when power is applied to the motor 102. A support means 105 is depicted fastened to the rotor 104 so that it revolves when rotor 104 revolves. In FIG. 1, the support means is depicted as a metal bar with a cutout which is inserted over the rotor 104 and secured thereto. It will be appreciated that the support means 105 may be made from a wide variety of materials and may be any number of different shapes. For example, the support means could be a circular plate made of light-weight, durable plastic. This configuration would be particularly useful when it is desirable to have more than two rollers 107.

Attached to either side of the support means 105 is a roller support bracket 106. A roller 107 is secured to each roller support bracket 106 by means of an axle or any number of methods. When power is applied to the motor 102, the rollers will then traverse in a circular path around and directly over the base 101.

It will be appreciated that the present invention encompasses a wide variety of methods to connect the rollers 107 to the support means and that the brackets 106 depicted in FIG. 1 is merely just one such example. It will be further appreciated that the rollers 107 may be made from a wide variety of materials including metals, plastics and/or composites. Moreover the rollers may be any one of a variety of shapes as well. In fact, for cost-effectiveness, the rollers may be off-the-shelf castors that are very inexpensive.

Although two rollers 107 are depicted in FIG. 1, it will be appreciated that the present invention covers any number of rollers 107. For most applications, two rollers will probably be preferable. However, for example three rollers 107 could be used. In such an example, a support means 105 that is a circular plate would be preferable over a metal bar. It is also preferable to space the roller so that they are evenly positioned for balance of the system 100. Thus, in a two roller 107 system 100, the rollers 107 would be spaced 180° apart. In a three roller 107 system 100, the rollers 107 would be spaced 120° apart, etc.

In operation, one or more mechanized exterminators 100 are placed directly on top of one more insect colonies such as a fire ant colony. Depending soil conditions, it may be helpful to loosen the soil to allow the fire ants free access to the exterminator. This may also induce a state of aggressiveness in the colony of fire ants. When power is applied to the motor 102, the rollers begin to roll over the base 101 in a circular path. The noise and the vibration of the mechanized exterminator 100 will cause the colony to become more aggressive and thereby attracting them on to the base 101. The curved end/circumference of the base 101 is no deterrent at all in this agitated/aggressive state. As they move toward the source of the noise and vibration, the rollers roll over them and crush them. After an appropriate time depending on the size of the colony, weather, etc., the health and strength of the colony will have been so diminished as to severely impact their ability to reproduce.

Optionally, a cover 115 may be used, if desired, to protect the system 100 from the elements and/or for aesthetics. In FIG. 1, the cover 115 is shown and is supported by a plurality of pegs or studs 116 extending outward from the base 101. The sides of the cover 115 rest on the pegs 116 while the top of the cover is safely above the other components. The system 100 will then be protected from the elements while not interfering in any way with the movement of the insects into the base or the operation of the base.

It will be appreciated that the cover 115 may be made from any number of materials. It is desirable, however, that the material be lightweight and cost-effective. The material may be transparent or completely non-transparent or anything in between. It will be further appreciated that numbers of means may be employed to support the cover in lieu of pegs 116. The cover 115 may even be constructed so as to rest on the ground and eliminate the need for any supporting pegs.

Figure 2:
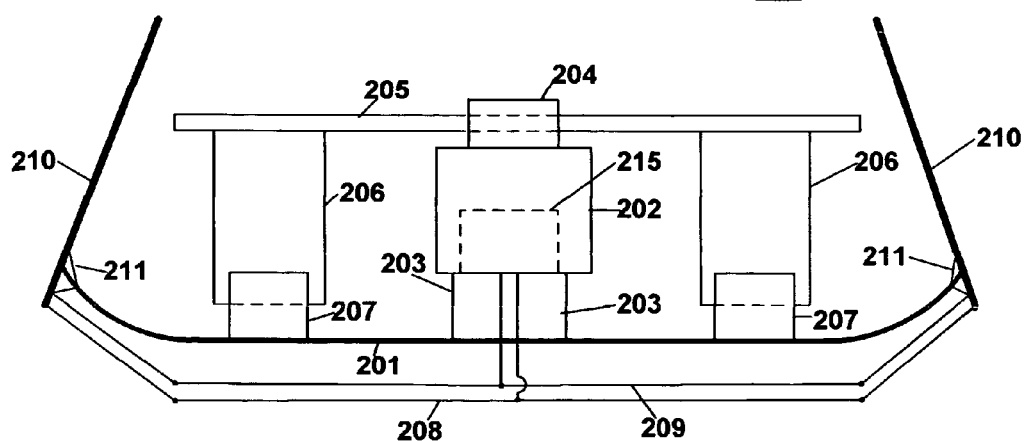
FIG. 2 is a cross-sectional view of the mechanized insect exterminator with two solar cells powering the exterminator.

Referring now to FIG. 2, another embodiment of the mechanized insect exterminator 200 is depicted. The system 200 is identical to the system 100 in FIG. 1 except that two solar cells 210 are depicted and are used for the power source for this system. The base 201, motor 202, support assembly 203, rotor 204, support means 205, roller support brackets 206, and rollers 207 function in the same manner as described for their counterparts in FIG. 1.

The solar cells 210 are commercially available and provide electrical power to the motor 202 from the conversion of solar energy to electricity. It will be appreciated that any number of solar cells may be used with the present invention depending on cost and application desires. In the example shown in FIG. 2, two such solar cells 210 are shown so that one can be positioned facing to the East and the other facing to the West, for example, to insure ample sunlight is on at least one of the solar cells from dawn until dusk.

It will be further appreciated that the present invention may be employed with both solar cells and rechargeable batteries 215 wherein the batteries operate the system 200 and the solar cells 210 recharge the batteries thereby permitting 24 hour operation of the system.

Each of the solar cells 210 are attached to the base 201 by means of a clip 211 which allows for easy connection and removal or replacement. It will be appreciated that any number of means are available to attach the solar cells 210 to the system 200 and that the clips 211 are just one example thereof.

The output conductors from the solar cells 210 are connected to the motor conductors. Thus whenever there is sun, the system 200 will be in operation. It will be appreciated that any number of means may be used to connect the solar cells 210 to the motor 202. A switch may be added as well, if desired.

Figure 3:
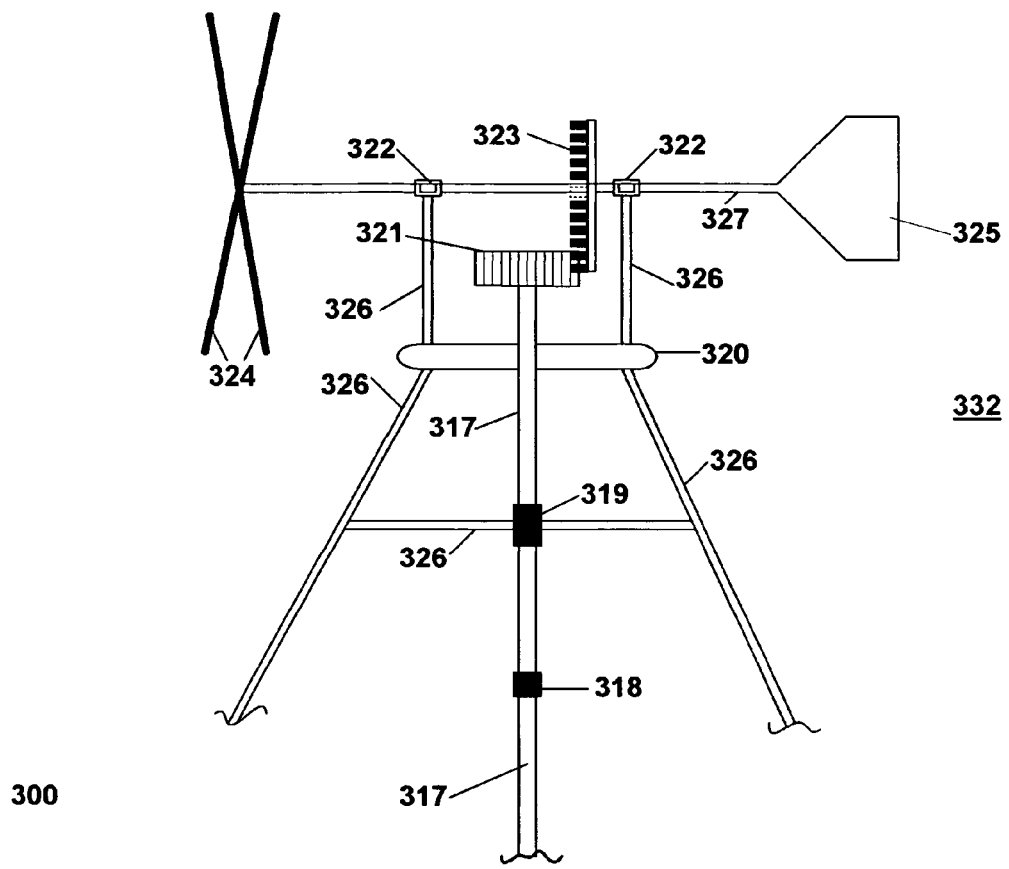
FIG. 3 is a cross-sectional view of the mechanized insect exterminator powered by wind.
Figure 3:
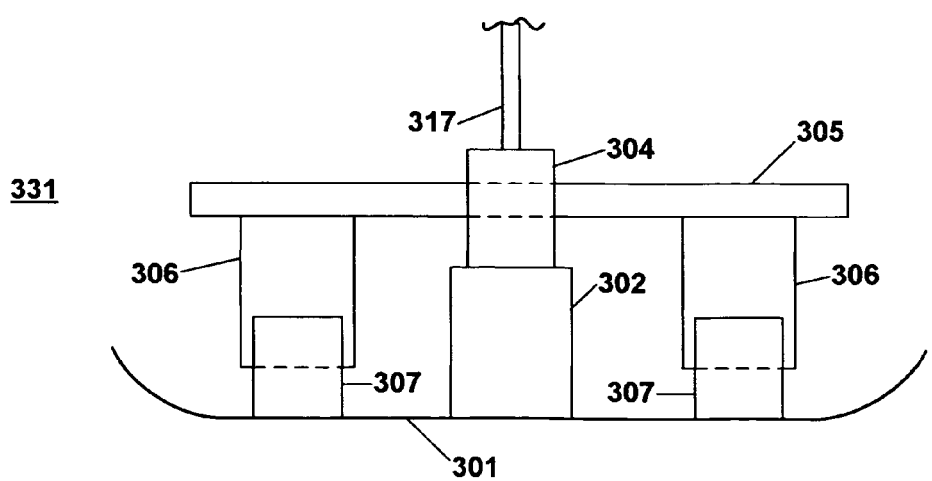

Referring now to FIG. 3, yet another embodiment of the mechanized insect exterminator 300 is depicted. The system 300 is similar to the system 100 in FIG. 1 except that it is powered by wind. The base 301, rotor 304, support means 305, roller support brackets 306, and rollers 307 function in the same manner as described for their counterparts in FIG. 1. It will be appreciated, however, that the size of these components may be different than that of FIG. 1.

In FIG. 3, a cross-sectional view of the system 300 is depicted. For ease of viewing and explanation, the system 300 is further depicted in two parts; a base unit 331, similar to the unit depicted in FIG. 1, and a wind power source 332. A drive shaft 317 connects the two units 331 and 332. For convenience, unit 331 is enlarged relative to unit 332 and, in operation, unit 331 would be disposed on the ground over the fire ant colony underneath the supporting frame 326 of unit 332.

In the base unit 331, the rotor 304 is coupled to the wind-powered, drive mechanism unit 332 for the system 300 by means of a drive shaft 317. The drive shaft 317 is coupled to a gear assembly 321 through a slip joint 318 and a bushing and sleeve assembly 319. The gear assembly 321 engages a cam 323 secured to a support arm 327. The support arm is coupled to a plurality of windmill blades 324 at one end and a tail 325 at the other end. The support arm 327 is secured to the wind-powered drive mechanism unit 332 by means of a pair of bushing and sleeve assemblies 322 which are, in turn, coupled to the frame 326 of the unit 332.

The frame 326 for the wind-powered drive mechanism unit 332 is depicted in two parts. The upper portion of the frame 326 is coupled to the lower portion of the frame 326 by means of a ball bearing plate 320 which allows the upper portion of the frame 326 to rotate with the wind direction while maintaining the lower portion of the frame 326 stationary.

In operation, the wind blowing on the tail section 325 will orient the windmill blades 324 to the direction of the wind. The wind causes the blades 324 to rotate which in turn causes support arm 327 to rotate. The cam 323 secured to the support arm 327 engages the gear assembly 321 thereby causing the drive shaft 317 to rotate and drive the rotor 304 in the base unit 331. The base unit 331 is thus engaged and operates in the manner described for FIG. 1, crushing the insects that are attracted into the base 301. In operation, it may be preferable to anchor the frame 326 or the base unit 331 or both for stability.

It will be appreciated that any number of designs and configurations for a wind powered drive mechanism are within the scope of the present invention and that the design thereof depicted in FIG. 3 is merely illustrative.

Thus, the present invention has been described herein with reference to particular embodiments for particular applications. Those having ordinary skill in the art and access to the present teachings will recognize additional modifications, applications, and embodiments within the scope thereof.

It is, therefore, intended by the appended claims to cover any and all such applications, modifications, and embodiments within the scope of the present invention.

What is claimed is:

1. A portable mechanized exterminator for insects comprising:
   a stationary base having a first stationary surface and a second stationary surface disposed, the first and second surfaces disposed oppositely to each other, and wherein, when the exterminator is in operation and placed on the insect colony the first stationary surface is in contact with the insect colony on the ground;
   a light-weight support having one or more rollers coupled thereto and disposed such that the rollers are in contact with the second stationary surface of the base;
   a drive mechanism coupled to the support for rotating the support such that the rollers roll over the second stationary surface of the base; and
   wherein the vibration of the exterminator in operation and placed on the insect colony agitates the insects causing the insects to get on the second stationary surface of the base where the rollers roll over and crush them.

2. The exterminator of claim 1 further comprising a power source.

3. The exterminator of claim 1 wherein the drive mechanism includes a motor.

4. The exterminator of claim 2 wherein the power source includes one or more solar cells.

5. The exterminator of claim 2 wherein the power source is located remotely.

6. The exterminator of claim 2 wherein the power source includes one or more batteries.

7. The exterminator of claim 6 wherein one or more of the batteries are re-chargeable.

8. The exterminator of claim 2 wherein the power source includes one or more batteries and one or more solar cells.

9. The exterminator of claim 7 further including one or more solar cells and wherein one or more of the solar cells re-charges the re-chargeable batteries.

10. The exterminator of claim 2 wherein the power source is wind.

11. The exterminator of claim 1 wherein the rollers are castors.

12. The exterminator of claim 1 further comprising a cover.

13. A method of exterminating insects using a portable mechanized exterminator having a stationary base with a first stationary surface and a second stationary surface, the first and second surfaces disposed oppositely to each other, and wherein, when the exterminator is in operation and placed on the insect colony the first stationary surface is in contact with the insect colony on the ground, a light-weight support having one or more rollers coupled thereto and disposed such that the rollers are in contact with the second stationary surface of the base; a drive mechanism coupled to the support for rotating the support such that the rollers roll over the second stationary surface of the base; and comprising the steps of:
   placing the exterminator on an insect colony;
   operating the exterminator;
   agitating the insects with the vibrations of the exterminator in operation and causing the insects to go on the second surface of the base; and
   rolling over the insects on the second surface of the base and exterminating them.

14. The exterminator of claim 1 wherein the drive mechanism includes a drive shaft.

15. The exterminator of claim 1 wherein the support is a plate.

16. The exterminator of claim 1 wherein the support is a disc.

17. The method of claim 13 further including the step of: powering the exterminator by one or more solar cells.

18. The method of claim 13 further including the step of: powering the exterminator by one or more batteries.

19. The method of claim 13 further including the step of: powering the exterminator by wind.

20. The method of claim 13 further including the steps of: powering the exterminator by one or more solar cells and one or more batteries: and re-charging the batteries by one or more of the solar cells.

* * * * *